G. H. BURRAGE.
COURSE AND DISTANCE FINDER.
APPLICATION FILED OCT. 16, 1909.

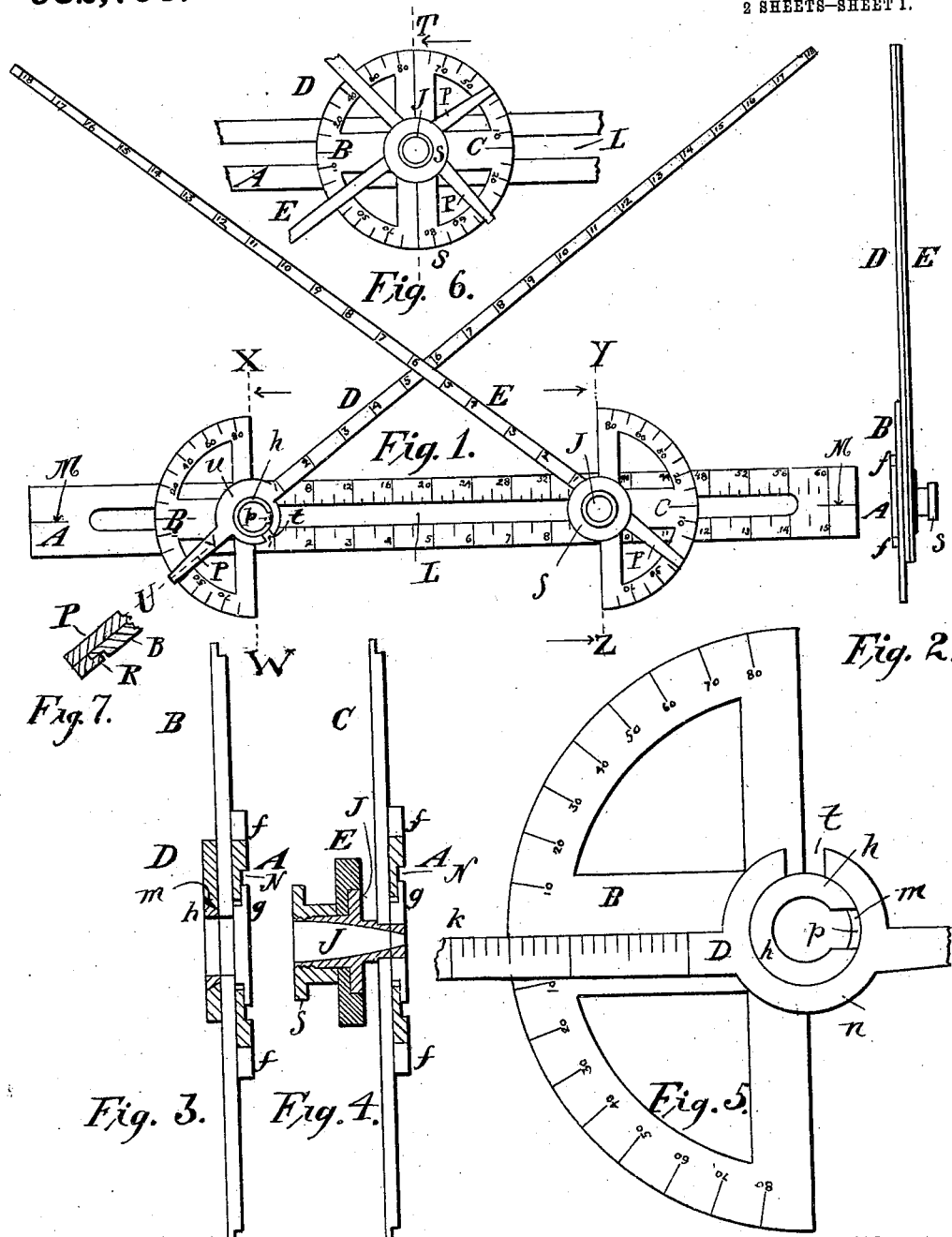

982,793.

Patented Jan. 31, 1911.

2 SHEETS—SHEET 2.

WITNESSES:
Fred C. Miller
Clarence C. Hunicke

INVENTOR
Guy H. Burrage
BY
Samuel E. Darby
ATTORNEY

UNITED STATES PATENT OFFICE.

GUY H. BURRAGE, OF THE UNITED STATES NAVY.

COURSE AND DISTANCE FINDER.

982,793.  Specification of Letters Patent.  Patented Jan. 31, 1911.

Application filed October 16, 1909. Serial No. 523,015.

*To all whom it may concern:*

Be it known that I, GUY H. BURRAGE, U. S. Navy, a citizen of the United States, residing at Washington, District of Columbia, have made a certain new and useful Invention in Course and Distance Finders, of which the following is a specification.

This invention relates to devices for use in navigation, piloting, surveying or similar work.

The object of the invention is to provide a device which is simple in structure, economical to manufacture, and easily and readily understood and manipulated, for quickly and accurately solving navigational, piloting, surveying or similar problems.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Figure 8:
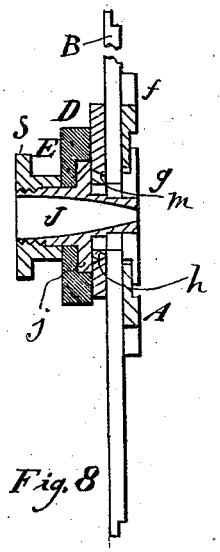
Figure 9:
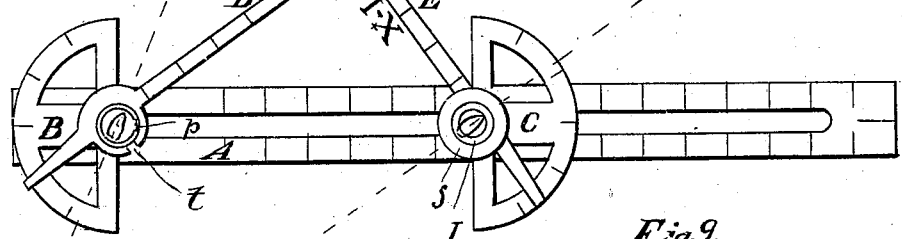

Referring to the accompanying drawings, and to the various views and reference signs appearing thereon,—Figure 1 is a view in plan of a course and distance finder, constructed in accordance with the principles of my invention, the half-circle segments being separated or spaced apart from each other. Fig. 2 is an end view of the same. Fig. 3 is a view in section on the line X, W, Fig. 1, looking in the direction of the arrows. Fig. 4 is a view similar to Fig. 3, on the line Y, Z, Fig. 1, looking in the direction of the arrows. Fig. 5 is a view in plan, parts broken off, of one of the graduated half-circle segments, showing the manner of application thereto of the pivoted arm. Fig. 6 is a view similar to Fig. 1, parts broken off, showing the two half-circle segments brought together with their respective arms pivoting about a common center. Fig. 7 is a broken detail view in section on the line U, V, Fig. 1. Fig. 8 is a view in section on the line T, S, Fig. 6. Fig. 9 is a view similar to Fig. 1, illustrating the manner of use of the device in the solution of one, among many, of the problems in navigation which the device is designed to accomplish.

The same part is designated by the same reference character wherever it occurs throughout the several views.

In the navigation, piloting, handling or maneuvering of vessels at sea, whether in fleet or squadron work, or when acting alone, the necessity constantly arises for the captain, navigator, or other officer, to know on what course to steer the vessel in order to accurately gain a certain desired location or relative position, or to pass at a certain desired distance, a given point. It frequently becomes equally desirable and necessary to quickly and accurately ascertain or determine other information required or arising in the practical handling, navigating or maneuvering of a vessel.

It is among the special purposes of my invention to provide a device which is exceedingly simple, and easy to understand and manipulate whereby the required information or knowledge may be acquired quickly and accurately and without the necessity of figuring out the solution of problems involving angles or other mathematical calculations.

In carrying out my invention in its broadest scope, I employ a graduated base member, which, if desired, may be in the form of a ruler having a straight edge; and I associate with said base member, or base ruler, as I will hereinafter call it, two graduated half-circle segments, so mounted with reference to the base ruler as to be independently movable toward and from each other thereon, the chord faces of the half-circle segments being presented toward each other. And I associate with each of the segments a pivoted graduated arm, one special feature of the arrangement being that when the two half-circle segments are brought together the axes about which the graduated arms rock or swing are brought into coincidence with each other.

Other special features of the construction will be pointed out hereinafter.

In the drawings, I have shown one construction as illustrative of an operative and practical embodiment of my invention.

Reference sign A, designates the graduated base ruler. I have found it convenient to employ a base ruler having a straight edge, and having a longitudinal central elongated slot or opening L therein. I have also found it convenient in using the device in practice, to place marks indicated at M, on the flat side of the base ruler at the end thereof, as clearly shown in Fig. 1. The two side members of the base ruler, formed by the longitudinal central slot L, may be graduated on the flat surfaces thereof, as indicated, the graduation being in any desired denomination, such as inches, feet, yards, knots, miles, etc., the only essential being that the graduations represent equal spaces or subdivisions.

Mounted on the flat base ruler A, to slide back and forth thereon are the half-circle segments B, C, each being graduated on its upper flat face along the peripheral edge thereof, as shown, the graduations being preferably in degrees, with the zero point in the mid-length of the arc, and the graduations being of increasing value in both directions from said point, the mid or zero point being in line with the geometric longitudinal center line of the base ruler. The segments B, C, may be retained on the base ruler to slide easily therealong, in any suitable or convenient manner. In the arrangement shown, to which, however, my invention in its broadest scope, as defined in the claims, is not to be limited or restricted, I provide the segments B, C, with central hubs arranged to extend through the slot L in the base ruler, and having a cross piece $g$, arranged to engage against the underside of the base ruler, the latter being preferably countersunk, as indicated at N, so that the cross pieces $g$, may lie flush with the under flat side or surface of the base ruler, and hence not interfere with nor prevent the base ruler from lying flat upon a table, desk, mat, chart, or the like, when the device is in use. If desired, and in order to prevent the segments from being axially displaced or moved with relation to the base ruler the segments may be provided with lugs $f$, arranged to work against the side edges of the base ruler. These lugs also form guides to guide the segments when moved along the base ruler.

Reference characters D, E, designate graduated arms pivotally mounted, respectively, upon the segments B. C. Each arm has an extension P, beyond its pivoted axis, which extensions coöperate with the graduated scales on said segments.

As above indicated the arms D, E, are provided with graduated scale divisions. In practice, I prefer that the scale divisions on one face of each of the arms D, E, should correspond with the scale divisions of one of the side members or legs of the base ruler. Thus, in the example given in the drawings, one side member of the base ruler is graduated in equal divisions marked "1", "2", "3", etc., and it will be observed that the side surface of both of the arms D, E, shown in Fig. 1, is correspondingly marked. It will be observed that the other side member or portion of base ruler A, is marked in scale divisions designated "4", "8", "12", "16", etc., and in practice I propose to correspondingly mark the reverse flat side or face of one of the arms, D, E. One or the other of the arms D, E, may be steadied and guided in its swinging movements in any suitable or convenient manner. I have shown a simple arrangement which I have found satisfactory, wherein I provide the extension P, of the arm D, with an engaging lip R, see Fig. 7, designed to engage over the edge of the segment B.

As above indicated the arrangement is such that the axes about which the arms D, E, swing, are brought into coincidence when the two segments B, C, are brought together to form a complete circle, as indicated in Figs. 6 and 7, said arms, however, remaining independently movable about their respective coinciding axes. This result may be accomplished in many specifically different ways and while, therefore, I have shown, and will now describe one construction and arrangement embodying an operative device for the purpose stated, my invention, as defined in the claims is not to be limited or confined to the specific structure shown. In the form shown the segment D, is provided with a central raised bushing or ring $h$, the geometric center of which is concentric with a line normal to the plane of the circle, defined by the segment B, and at the center of such circle. The exterior surface of the ring $h$, is beveled so that the exterior diameter of the ring is smaller at the base of said ring where it joins the segment B, than at its outer face, as clearly shown at $m$, Figs. 3, 5 and 8. The arm D is provided with an enlargement $n$, having a circular opening therethrough thereby forming a hub, the interior surface of which is beveled to correspond with that of the ring $h$, and designed to receive and fit snugly about the ring $h$, the ring thereby forming a bearing about which the arm D may rock or swing. The parts are so proportioned that when the arm D, is applied and fitted to the ring $h$, the outer flat surfaces or faces of the arm and ring lie flush with each other, the inner face or surface of the arm D, bearing against the surface of the segment B. In order to facilitate the application of the arm to its guiding and retaining ring and the ready removal of said arm when desired, I cut away or omit a portion of the ring at one side thereof, as indicated at $p$, see Figs. 1, 5 and 9, and I similarly cut away or omit a portion of the hub of the arm, as indicated at $t$. By bringing the two cut-away or omitted portions $p$, $t$, into proper relation and giving the arm a slight tilt, said arm may be readily removed from or applied to the ring. The arm E is mounted to rock upon a bushing J, carried by the segment C, the geometric axis of the bushing being normal to the plane of the circle defined by said segment, and at the center of said circle. The bushing J, is provided with a flange $j$, and its outer end is exteriorly threaded to receive a clamp nut s. The arm C, is provided with an opening therethrough adapted to fit snugly over the bushing J, said arm being clamped between the clamp nut s, and the flange j. The friction of the fit of the arms D, E, upon their respective supports should be sufficient to enable said arms to be retained in any position of angular adjustment to which they may be swung. The inner face of flange j, is spaced away from the proximate surface of segment C, see Fig. 4, to enable the hub n, of arm D, to be received snugly therebetween when the two segments B, C, are brought together to complete the circle, as clearly shown in Figs. 6 and 8, the result being that when said segments are so brought together the arms D, E, rock or swing independently but about coinciding axes. In order to permit the two segments to be brought together to complete the circle and the axis of the arms to be brought into coinciding relation the arm D should be swung into position for the opening t, in the side thereof to be brought into register with the opening p, in the side of ring h, and when in this position, the stem of bushing J, may pass laterally through said side opening so as to bring the parts into the relation shown in Fig. 8.

The bushing J, has a longitudinal central opening therethrough which enables a pencil to be inserted to mark the center of the circle defined by the segment C, upon a chart or map when or as required or desired.

By unscrewing the clamp nut s, the arm E may be removed from its supporting point bushing, then reversed side for side and again applied. By reason of this reversibility of arm E, I am enabled to extend the scope of utility of the device by supplying graduations or scale divisions to both sides of the said arm, those on one side conforming to the graduations on one leg or side of the base ruler, and those on the other side conforming to the graduations on the other leg or side of the base ruler.

A device embodying the principles of my invention may be constructed of any suitable, convenient or desired material, and, when employed in connection with the navigating, piloting, handling or maneuvering vessels at sea, may be conveniently carried on the bridge or in the chart house or on the chart table, or elsewhere where it is instantly available for serivce. I do not desire, however, to be limited or restricted with respect to the uses or purposes to which the device is to be put as it is evident that many problems encountered in land surveying and other civil engineering work might be solved by its use, with ease and accuracy. I will illustrate however, one example of use of the device for navigating and vessel maneuvering purposes, particular reference being had to Fig. 9.

Suppose a number of vessels are in column, $1^s$ designating the guide, and $4^s$ the observing vessel, and it is desired to form line say, for instance, on the left of the guide. The problem at once arises as to the proper course to steer the observing vessel $4^s$ in order that it may attain its proper position in the line and still maintain its proper distance from the guide. The distance between the two vessels at any time can be readily ascertained by the usual methods; so, too, the angle between the course steered by the guide and the bearing of the guide from the observing vessel may be readily ascertained in the usual way. With this data the two segments B, C, are separated a distance on the base ruler A corresponding to the ascertained distance apart of the guide and observing vessel; the arm D is swung to an angle marked on the segment B corresponding to the ascertained angle between the course of the guide and its bearing from the observing vessel; the arm E, is now swung to a position at right angles to the arm D, and the distance 1-X is read off from the scale on arm E. This is the distance the observing vessel would be when abeam of the guide and sailing on a parallel course therewith. By repeating the observations as often as may be necessary or desired the changing distance 1-X, can be followed, and, making allowances in each individual case for the distance gained or lost in turning the approximate time for changing the course of the observing vessel so as to parallel that of the guide in order to arrive on the line at the desired distance abeam is readily ascertained. After the observing vessel has changed its course to parallel that of the guide, observations in the usual manner to ascertain the distance away of the guide and the angle between the course of the observing vessel and the bearing of the guide will at once show the distance the observing vessel will be from the guide when abeam. If this distance, so ascertained, is not the desired or required distance, the arm D, is rocked about its pivot until the desired distance is indicated on arm E. The angle through which it was necessary to so rock or swing arm D, is noted on the segment B, and this angle will give the necessary change of course in degrees to enable the observing vessel to arrive at the correct position and distance from the guide. With equal facility the relative courses of vessels, the navigational problems of scouting, the piloting of a vessel from observations of bearings of one or more objects on shore; two bearings of a stationary object on shore with a change in course after the first observation, and many other problems may be quickly and accurately solved by the use of the device. It will also be seen that the device may also be used as a three-armed protractor, when desired or required, thus extending the range of utility of the instrument. It will also be obvious to those skilled in the use of devices of this nature that a structure embodying my invention may be used and found useful for many other purposes. I do not desire to be limited, therefore, in respect of the use to which the device is to be put.

Having now set forth the object and nature of my invention, and a construction embodying the principles thereof, and having described such construction, its purpose, function and mode of operation, what I claim as new and useful, and of my own invention and desire to secure by Letters Patent is:

1. In a device for use in solving navigational or similar problems, a base ruler, a half-circle segment mounted to slide thereon, and having a pivot ring, and an arm having a hub to fit over and rock or swing upon said pivot ring, said ring and hub having cut-away portions to facilitate the application and removal of the arm to or from its pivot ring.

2. In a device for use in solving navigational or similar problems, a base ruler, half-circle segments mounted to slide thereon, a pivot bushing carried by one of said segments and a pivot ring carried by the other of said segments, arms pivotally mounted on said ring and bushing respectively, said ring having a cut-away portion to receive the bushing therein when the segments are brought together whereby the axes of said arms are brought into coincidence.

3. In a device for use in solving navigational or similar problems, a base ruler, half-circle segments mounted thereon, and adapted to be brought together to complete the circle, pivot bushings carried by said segments, one of said bushings having a cutaway portion in the side thereof, and arms mounted to rock or swing on said pivot bushings, whereby the pivotal axes of said arms coincide with each other when the segments are brought together to complete the circle.

4. In a device for use in solving navigational or similar problems, a graduated base ruler, a graduated segment carried thereby, a pivot bushing carried by said segment and having a cutaway portion, and a graduated arm having a hub, to fit upon said bushing, said hub having a cutaway portion to facilitate the application and removal of the hub to and from the bushing.

5. In a device for use in solving navigational or similar problems, a base ruler, half circle segments mounted thereon, and arms having pivotal connections with said segments, respectively, the pivotal connection of one of said arms being cutaway on one side to permit the axes of said arms to be brought into coinciding relation when said segments are brought together to complete the circle.

6. In a device for use in solving navigational or similar problems, a base ruler, a segment mounted thereon and provided with a truncated cone-shaped pivot ring, and an arm having a correspondingly beveled hub to fit over and rock or swing upon said ring, said ring and hub having cutaway portions.

7. In a device for use in solving navigational or similar problems, a base ruler, half-circle segments mounted thereon to slide therealong, each segment carrying a pivot, one of said pivots being in the form of a ring and having a cutaway portion in the side thereof to permit the other pivot to pass therethrough and arms respectively mounted to rock or swing upon said pivots.

In testimony whereof I have hereunto set my hand in the presence of the subscribing witnesses on this 14th day of October A. D., 1909.

GUY H. BURRAGE.

Witnesses:
SIDNEY ROSENTHAL,
VICTOR A. LEWIS.